United States Patent
Bremer et al.

(10) Patent No.: US 11,365,863 B2
(45) Date of Patent: Jun. 21, 2022

(54) PROJECTION SYSTEM AND VEHICLE WITH A PROJECTION SYSTEM

(71) Applicant: SUSS MicroOptics SA, Hauterive (CH)

(72) Inventors: Christopher Bremer, Hauterive (CH); Giorgio Quaranta, Hauterive (CH); Wilfried Noell, Hauterive (CH); Toralf Scharf, Hauterive (CH)

(73) Assignee: SUSS MICROOPTICS SA

( * ) Notice: Subject to any disclaimer, the term of this patent is extended or adjusted under 35 U.S.C. 154(b) by 0 days.

(21) Appl. No.: 17/313,846

(22) Filed: May 6, 2021

(65) Prior Publication Data

US 2021/0348736 A1    Nov. 11, 2021

(30) Foreign Application Priority Data

May 6, 2020    (DE) ..................... 10 2020 112 316.7

(51) Int. Cl.
*F21S 43/20*    (2018.01)
*F21V 5/00*    (2018.01)
(Continued)

(52) U.S. Cl.
CPC .............. *F21S 43/26* (2018.01); *F21V 5/007* (2013.01); *F21V 11/08* (2013.01); *F21W 2103/60* (2018.01)

(58) Field of Classification Search
CPC ................ B60Q 1/323; B60Q 2400/40; B60Q 2400/50; B60Q 1/24; F21S 41/151;
(Continued)

(56) References Cited

U.S. PATENT DOCUMENTS

| 4,816,968 A * | 3/1989 | Yamada | .................... B60Q 1/28 362/268 |
| 7,192,172 B1 | 3/2007 | Alberti | ..................... B60Q 3/04 |

(Continued)

FOREIGN PATENT DOCUMENTS

| CN | 209167790 | | 7/2019 | ............. G03B 21/20 |
| DE | 102008019118 | * | 10/2009 | ................ F21S 8/10 |

(Continued)

OTHER PUBLICATIONS

English Machine Translation of DE 102017123830 provided by ESPACENET (Year: 2017).*

(Continued)

*Primary Examiner* — Zheng Song
(74) *Attorney, Agent, or Firm* — Hayes Soloway P.C.

(57) ABSTRACT

A projection system for a vehicle, in particular for an ambient lighting device for generating a plurality of light cones for illuminating the ground in the surroundings of the vehicle, includes at least one light source and a microlens array. The microlens array includes an optical axis, a first portion with at least one first channel and a second portion with at least one second channel. The projection system includes an optical device that is provided downstream of the microlens array and is arranged at least in the area of the first portion, with the distance between the microlens array and the optical device being less than 20 mm. Light emitted by the light source, which falls through the at least one first channel of the first portion, is deflected by the optical device by a first angle with respect to the optical axis and forms a first light cone, and light emitted by the light source, which falls through the at least one second channel of the second portion, is deflected by a second angle with respect to the optical axis, which differs from the first angle, and forms a second light cone.

20 Claims, 5 Drawing Sheets

(51) Int. Cl.
*F21V 11/08* (2006.01)
*F21W 103/60* (2018.01)

(58) Field of Classification Search
CPC ...... F21S 41/265; F21S 43/241; F21S 43/245;
F21S 43/247; F21S 43/26; F21S 41/143;
F21S 41/285; F21S 41/43; F21S 41/675;
F21V 11/08; F21V 5/007; F21W 2103/15;
F21W 2103/60; G02B 27/18
See application file for complete search history.

(56) References Cited

U.S. PATENT DOCUMENTS

| | | | | |
|---|---|---|---|---|
| 10,006,600 | B2* | 6/2018 | Jo | G02B 30/27 |
| 10,232,763 | B1 | 3/2019 | Eckstein et al. | B60Q 1/08 |
| 10,696,219 | B2* | 6/2020 | Fleurence | B60Q 3/60 |
| 2014/0093665 | A1* | 4/2014 | Horibe | B60R 13/005 |
| | | | | 428/31 |
| 2016/0265733 | A1 | 9/2016 | Bauer et al. | F21S 8/10 |
| 2017/0114975 | A1 | 4/2017 | Hiki | F21S 8/10 |
| 2018/0106450 | A1 | 4/2018 | Kamau et al. | F21S 8/10 |
| 2018/0236929 | A1 | 8/2018 | Gocke et al. | B60Q 1/24 |
| 2018/0335191 | A1 | 11/2018 | Stefanov et al. | F21S 41/265 |
| 2019/0011102 | A1 | 1/2019 | Gehb et al. | F21S 41/255 |
| 2019/0078748 | A1* | 3/2019 | Wang | G02B 3/005 |
| 2019/0263318 | A1 | 8/2019 | Brill et al. | B60Q 1/323 |
| 2020/0088374 | A1 | 3/2020 | Kogure et al. | F21S 41/25 |
| 2020/0377009 | A1* | 12/2020 | Schmidt | B60R 1/1207 |
| 2021/0231280 | A1* | 7/2021 | Schreiber | F21S 41/143 |
| 2021/0262634 | A1* | 8/2021 | Lim | F21S 41/635 |

FOREIGN PATENT DOCUMENTS

| | | | | |
|---|---|---|---|---|
| DE | 102015107644 | * | 11/2016 | F21S 43/14 |
| DE | 10 2015 220 911 | | 4/2017 | B60Q 1/24 |
| DE | 102016204344 | | 9/2017 | F21S 8/12 |
| DE | 10 2016 221 918 | | 5/2018 | G02B 27/18 |
| DE | 102017123830 | * | 4/2019 | F21S 43/40 |
| DE | 102018102175 | * | 8/2019 | B03B 21/00 |
| DE | 102018202144 | | 8/2019 | F21V 13/00 |
| DE | 10 2018 203 875 | | 9/2019 | F21S 43/00 |
| DE | 102019216478 | * | 4/2021 | F21S 43/14 |
| EP | 3159597 | | 4/2017 | F21S 8/10 |
| EP | 3312501 | | 4/2018 | F21S 41/143 |
| EP | 3404313 | | 11/2018 | F21S 41/143 |
| EP | 3540294 | | 9/2019 | F21S 41/125 |
| WO | WO 2015058227 | | 4/2015 | F21S 8/10 |

OTHER PUBLICATIONS

English Machine Translation of DE 102008019118 provided by ESPACENET (Year: 2008).*

* cited by examiner

PROJECTION SYSTEM AND VEHICLE WITH A PROJECTION SYSTEM

This invention relates to a projection system for a vehicle, in particular for an ambient lighting device for generating a plurality of light cones for illuminating the ground in the surroundings of the vehicle, comprising a light source and a microlens array. Furthermore, the invention relates to a vehicle with such a projection system.

BACKGROUND OF THE INVENTION

Projection systems for vehicles are known.

These projection systems usually are employed to illuminate an area of the ground in the surroundings of the vehicle in order to provide a person entering the vehicle or exiting from the vehicle with an orientation aid and to make the soil condition more visible, in particular in the dark or in bad weather conditions, whereby safety is improved.

Projection systems comprising a microlens array have the advantage that they are designed very compact and hence can be used in areas in which only a small installation space is available, for example in the door handle of a vehicle. In this type of projection systems, however, it is disadvantageous that the light cone generated is limited to a narrow angular range, usually about 20°, so that only a very limited area in the surroundings of the vehicle can be utilized as a projection surface.

It is the object of the invention to provide a projection system for a vehicle, which both is of compact design and eliminates the limitation of the prior art projection systems and hence can be used more flexibly.

BRIEF DESCRIPTION OF THE INVENTION

To achieve this object, there is provided a projection system for a vehicle, in particular for an ambient lighting device for generating a plurality of light cones for illuminating the ground in the surroundings of the vehicle, comprising at least one light source and a microlens array. The microlens array includes an optical axis, a first portion with at least one first channel, and a second portion with at least one second channel. Furthermore, the projection system includes an optical device that is provided downstream of the microlens array and at least is arranged in the region of the first portion, i.e. the microlens array is arranged in the beam path between the light source and the optical device. Light emitted by the light source, which falls through the at least one first channel of the first portion, is deflected by the optical device by a first angle with respect to the optical axis and forms a first light cone, whereas light emitted by the light source, which falls through the at least one second channel of the second portion, is deflected by a second angle with respect to the optical axis, which differs from the first angle, and forms a second light cone. In accordance with the invention, the first or the second angle can amount to 0°. Furthermore, two angles are different from each other in accordance with the invention when they differ in terms of their amount and/or their direction. The distance between the microlens array and the optical device is less than 20 mm, resulting in a very compact system.

In particular, the projection system only has a microlens array between light source and optical device.

It has been detected that by means of the optical device at least one of the two light cones can be deflected in order to extend the angular range in which the projection system can illuminate projection surfaces. Furthermore, two separate light cones are formed, which can be used jointly or separately to illuminate surfaces or to provide a projection. In contrast to a projection system in which the two light cones are provided by two separate microlens arrays angled relative to each other, the projection system according to the invention has the advantage that it can be of more compact construction, as an individual microlens array requires less installation space than two microlens arrays of comparable size, which are arranged at an angle to each other. Furthermore, the holding device for an individual microlens array may be less complex in design. Furthermore, the projection system may have a simpler construction, in particular when a common board is used for a plurality of components. In addition, the assembly effort is reduced. In this way, there is provided a projection system that is flexibly usable for different applications and furthermore requires little installation space.

The first angle can be more than 0°, in particular at least 10°, preferably at least 15°. Additionally or alternatively, the second angle can be less than 0°, in particular less than −10°, preferably less than −15°. The first and second light cones thereby are spatially separated from each other so that they can illuminate separate projection surfaces.

Additionally or alternatively, the difference between the first angle and the second angle can be at least 15°, in particular at least 25°, whereby the two light cones are spatially separated from each other particularly far.

In one embodiment, the microlens array has a mask layer for generating a motif and/or a projection lens array. In particular, the mask layer can be formed in the first portion and in the second portion in order to generate different motifs. Thus, it is possible to project motifs that can provide information to the viewer or can improve the aesthetics of the projection.

The mask layer can provide a complete image and/or partial image for each lens of the microlens array so that all lenses of a portion generate an individual image and the corresponding projection is composed of the superposition of these individual images.

Of course, more than one mask layer can be provided.

In another embodiment, the microlens array has an opaque portion between the first portion and the second portion, in particular with at least one closed microlens and/or a closed channel. "Closed" here in particular means so opaque that no defined beam path is present in the direction of the optical axis completely through the microlens array, e.g. due to roughening, covering or blackening. The opaque portion reliably separates the first portion from the second portion so that it is ensured that no light falls from one portion into the other portion. This improves the quality of the projection that is provided by the corresponding portion.

It can be provided that the light source includes an emission unit with a light-emitting element and a collimating element. The light-emitting element is arranged on the optical axis of the collimating element or offset perpendicularly to the optical axis of the collimating element. Via the relative arrangement from the light-emitting element and to the collimating element, the beam path of the projection system and the angles can be set larger, wherein the light generated by the light-emitting element follows said beam path.

According to one embodiment, the light source includes a first emission unit and a second emission unit. The first emission unit is associated with the first portion, and the second emission unit is associated with the second portion. Thus, emitted light of the first emission unit flows through the first portion, and emitted light of the second emission unit flows through the second portion. In this way, the first and second light cones can be provided separately, which increases flexibility in the application of the projection system.

According to another embodiment, the optical device includes a first optical element that is associated with the first portion of the microlens array and a second optical element that is associated with the second portion of the microlens array, in particular wherein the first optical element and the second optical element have different refractive indices and/or are made of different materials. Light emitted by the light source, which falls through the at least one first channel of the first portion, is deflected by the first optical element, while light emitted by the light source, which falls through the at least one second channel of the second portion, is deflected by the second optical element. Thus, the light of the corresponding portions can each be individually deflected by the associated optical element.

The optical elements of the optical device can jointly be configured in one piece, which can render the manufacture of the projection system less expensive.

Furthermore, the optical device in one embodiment can comprise one or more optical elements from the following group: a prism, in particular an injection molded prism, a lens, a lens array, a freeform optic, a micromirror array (Digital Micromirror Device—DMD) and/or a liquid crystal matrix (LC matrix).

In another embodiment, the projection system includes an adjusting device for the optical device, by means of which at least one optical element of the optical device is adjustable between different positions. Via the different positions, it is possible to vary the way in which the light is deflected by the corresponding optical element. In particular, the light cone that is associated with the optical element can thereby be adjusted.

The adjusting device can include a drive that is configured to rotate the at least one optical element of the optical device about an axis of rotation and/or to swivel the same about a swivel axis.

In particular, the axis of rotation extends parallel to the optical axis of the microlens array or the swivel axis is perpendicular to the optical axis of the microlens array.

According to one embodiment, the distance between the optical device and the microlens array is less than 10 mm, in particular less than 5 mm, whereby the projection system can be designed particularly compact and be received well protected in a shaft for the projection system, for example in the body of a vehicle.

Furthermore, it can be provided that the projection system has a state in which the first light cone and the second light cone do not overlap with each other, partly overlap with each other or completely overlap with each other. Thus, the two light cones can be used separately from each other in order to each generate a projection or, combined with each other, each at least sectionally form a joint projection.

According to one embodiment, the projection system has a state in which the first light cone and the second light cone partly overlap such that the luminous density in a plane, in particular a plane parallel to the ground, is homogeneous. In this way, a projection of particularly high quality can be generated, in particular in a direction in which the projection extends away from the projection system, as with increasing distance the illuminance and hence the luminous density of the projection decreases with increasing distance.

According to another embodiment, the optical device has a reflecting surface which reflects light that falls through the at least one first channel of the first portion and/or through the at least one second channel of the second portion. By means of reflection, the light can be deflected by a particularly large angle, whereby the field of application of the projection system is extended.

According to the invention, the above-mentioned object also is achieved by providing a vehicle with a projection system according to the invention with the aforementioned advantages.

BRIEF DESCRIPTION OF THE DRAWINGS

Further advantages and features can be taken from the following description and from the attached drawings, in which.

DETAILED DESCRIPTION OF THE INVENTION

Figure 1:
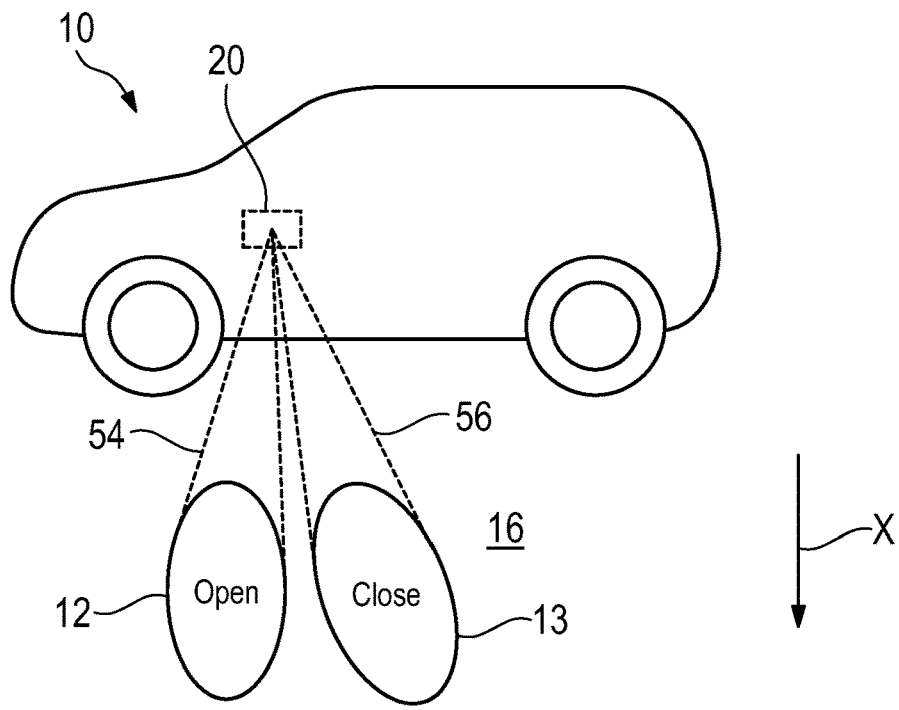
FIG. 1 shows a schematic representation of an inventive vehicle with an inventive projection system.

FIG. 1 shows a vehicle 10 with a projection system 20 by means of which projections 12, 13 can be projected onto surfaces in the surroundings of the vehicle 10.

The vehicle 10 for example is a passenger car. The projection system 20 is arranged below the driver's door of the vehicle 10 and is part of an ambient lighting device of the vehicle 10, which is provided to cast projections 12, 13 in the X-direction away from the vehicle 10 onto the ground 16 next to the driver's side.

In principle, the vehicle 10 can be any vehicle and the projection system 20 can be arranged at any point of the vehicle 10.

Figure 2:
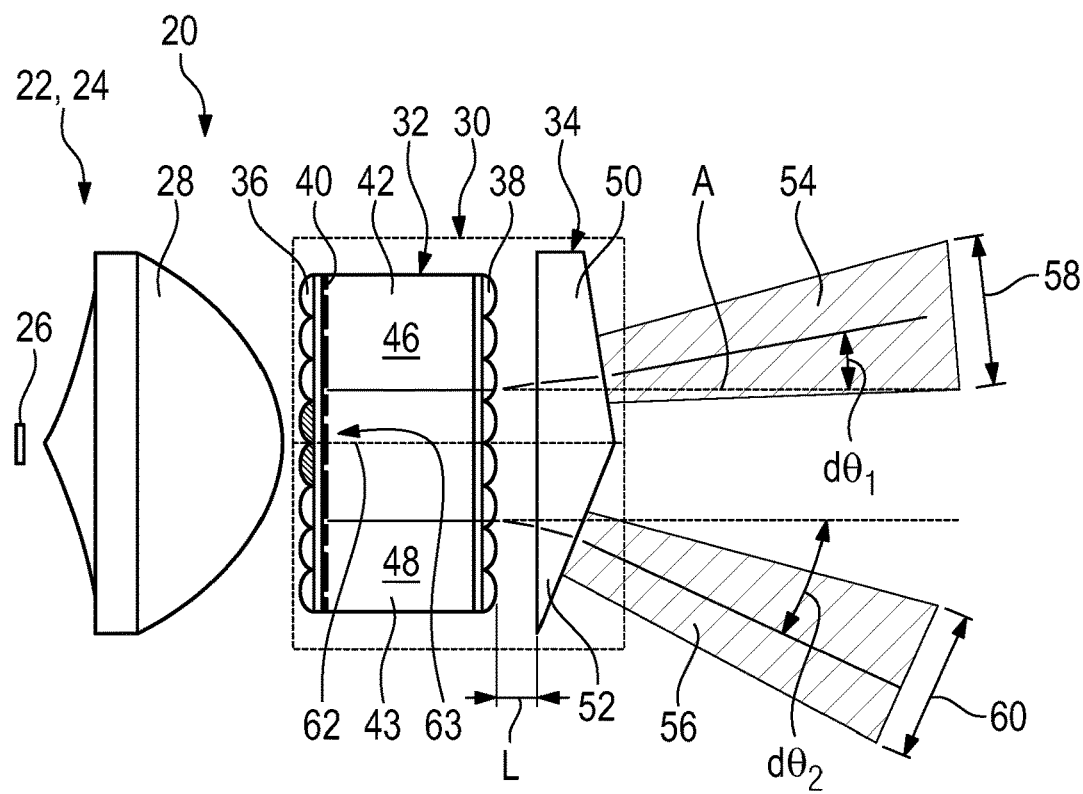
FIG. 2 shows a schematic representation of the projection system of FIG. 1 according to a first embodiment.

The projection system 20 (see FIG. 2) has a light source 22 and a projection module 30 that is arranged in the beam path of the light source 22.

The light source 22 comprises an emission unit 24 with a light-emitting element 26 and a collimating element 28.

The light-emitting element 26 for example is an LED or a quantum dot.

The collimating element 28 for example is a collimator.

The projection module 30 has a microlens array 32 with an optical axis A and an optical device 34 that is arranged in the beam path behind the microlens array 32.

The distance between the optical device 34 and the microlens array 32 is less than 20 mm so that a very compact system is obtained.

The microlens array 32 comprises a field lens array 36 with a plurality of field lenses, a projection lens array 38 with a plurality of projection lenses and a mask layer 40 with a plurality of mask parts, which is arranged between the field lens array 36 and the projection lens array 38.

It is also conceivable that a plurality of mask layers 40 are provided or that the mask layer 40 includes various sublayers.

With each field lens a projection lens and an interposed mask part are associated, which jointly form a channel 42, 43 of the microlens array 32. Thus, the microlens array 32 includes a plurality of channels 42, 43.

The microlens array 32 is divided into a first portion 46 and a second portion 48, the division extending in the direction of the beam path in the microlens array 32.

In the present embodiment, each portion 46, 48 comprises the same number of channels 42, 43.

In principle, the microlens array 32 can include any number of portions 46, 48 with any number of channels 42, 43, but at least one channel 42, 43 in each portion 46, 48.

The optical device 34 has a first optical element 50 that is associated with the first portion 46 of the microlens array 32, and a second optical element 52 that is associated with the second portion 48 of the microlens array 32.

The optical device 34 here is a one-piece prism, wherein one half of the prism each forms one of the two optical elements 50, 52.

In an alternative embodiment, the optical device 34 can at least comprise a prism, in particular an injection molded prism, a lens, a lens array, a freeform optic and/or a liquid crystal matrix.

The optical device 34 here is arranged directly behind the microlens array 32, i.e. the distance L between the optical device 34 and the microlens array 32 is less than 3 mm.

Alternatively, the optical device 34 can be arranged behind the microlens array 32 with a small distance, i.e. the distance L between the optical device 34 and the microlens array 32 is less than 10 mm, in particular less than 5 mm.

In operation, the emission unit 24 generates collimated light that falls through the channels 42, 43 onto the optical device 34, which deflects the light and forms a first light cone 54 and a separate second light cone 56. The light of the channels 42 of the first portion 46 falls onto the first optical element 50, by which the light is deflected by a first angle $d\theta_1$ with respect to the optical axis A, and forms the first light cone 54 with a first angular range 58.

The light of the channels 43 of the second portion 48 on the other hand falls onto the second optical element 52, by which the light is deflected by a second angle $d\theta_2$ with respect to the optical axis A, and forms the second light cone 56 with a second angular range 60.

The first angle $d\theta_1$ here is about +10°, while the second angle $d\theta_2$ is about −25°. Thus, the difference between the first angle $d\theta_1$ and the second angle $d\theta_2$ is about 35°, whereby the first and second light cones 54, 56 cover two angular ranges 58, 60 clearly separated from each other.

Of course, the first angle $d\theta_1$ and the second angle $d\theta_2$ can each be any size. As long as the two angles $d\theta_1$, $d\theta_2$ are not the same or their difference is not 360°, two separate light cones 54, 56 with different angular ranges 58, 60 are generated.

In an alternative embodiment, the first angle $d\theta_1$ can be more than 0°, in particular more than 10°, preferably more than 15°, and/or the second angle $d\theta_2$ can be less than 0°, in particular less than −10°, preferably less than −15°.

Additionally or alternatively, the difference between the first angle $d\theta_1$ and the second angle $d\theta_2$ can be at least 15°, in particular at least 25°.

In the present exemplary embodiment, as shown in FIG. 1, a first projection 12 with the motif "Open" is depicted on the ground 16 by means of the first light cone 54, and a second projection 13 with the motif "Close" is depicted on the ground 16 by means of the second light cone 56.

The mask parts that are associated with the channels 42 in the first portion 46 each include the motif "Open", while the mask parts that are associated with the channels 43 in the second portion 48 each include the motif "Close". Thus, each channel 42, 43 of a portion 46, 48 each forms an individual image comprising at least parts of the corresponding motif. The individual images of each portion 46, 48 together form a total image in the form of the projections 12, 13, which thereby have a particularly high quality.

In one embodiment, the projection system 20 can be part of an automatic door opening or door closing system, which is controlled by stepping onto the projections 12, 13.

Due to the large angular difference of the two light cones 54, 56, the projections 12, 13 are depicted in distinctly separate areas of the ground 16 also in the vicinity of the vehicle 10, whereby stepping onto an area can be detected reliably, even if the door opening or door closing system merely includes a simply designed, inexpensive image detection device.

To prevent the projections 12, 13 from impairing each other due to the fact that light from the first portion 46 falls onto the second optical element 52 or light from the second portion 48 falls onto the first optical element 50, the microlens array 32 furthermore includes an opaque separating layer 62 between the first and the second portion 46, 48, which inhibits the scattering of light from one portion 46, 48 into the other portion 46, 48.

Alternatively or additionally, an opaque portion 63 can be provided between the first and the second portion 46, 48, which is opaque parallel to the optical axis, i.e. in which no defined optical imaging is possible through the microlens array 32.

The opaque portion 63 is formed for example by closed channels 42, 43 (indicated in broken lines), in particular by the channels 42 of the first portion 46 adjacent to the second portion 48 and by the channels 43 of the second portion 48 adjacent to the first portion 46. The opaque portion 63 can thereby be produced at particularly low cost.

The channels 42, 43 can be closed by means of the mask layer 40.

In the following, further embodiments of the projection system 20 will be described, which substantially correspond to the projection system 20 of the first embodiment so that only the differences will be discussed. For identical structures with identical functions the same reference numerals will be used, and in so far reference is made to the preceding explanations.

Figure 3:
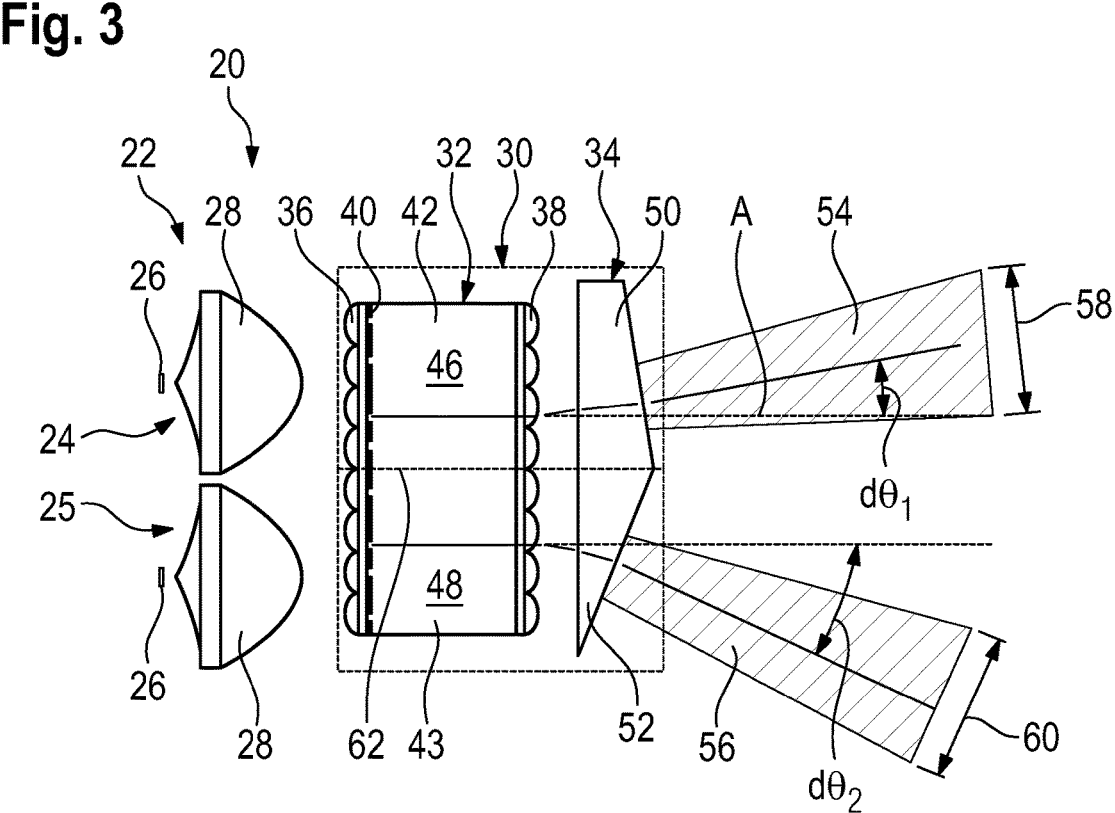
FIG. 3 shows a schematic representation of the projection system of FIG. 1 according to a second embodiment.

FIG. 3 shows a projection system 20 according to a second embodiment. In contrast to the first embodiment, the projection system 20 includes a light source 22 with a second emission unit 25.

The first emission unit 24 is associated with the first portion 46 so that the light emitted by the first emission unit 24, preferably exclusively, falls through the channels 42 of the first portion 46, while the second emission unit 25 is associated with the second portion 48 so that the light emitted by the second emission unit 25, preferably exclusively, falls through the channels 43 of the second portion 48.

In this way, the light cones 54, 56 and hence the projections 12, 13 can be controlled separately, for example by individually switching the emission units 24, 25 on and off.

Figure 4:
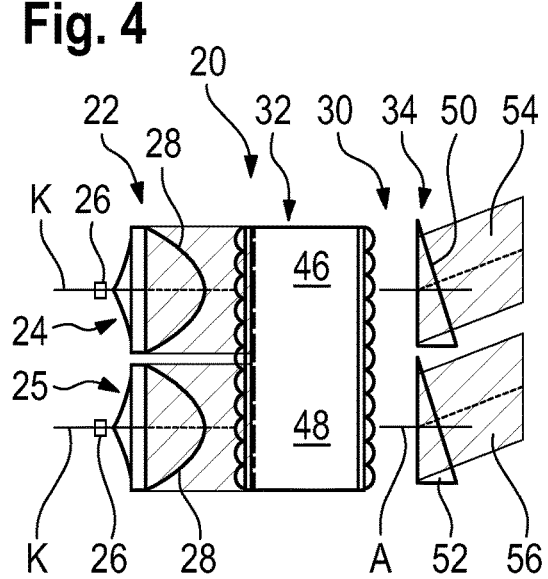
FIG. 4 shows a schematic representation of the projection system of FIG. 1 according to a third embodiment.

FIG. 4 shows a projection system 20 according to a third embodiment. In contrast to the second embodiment, the optical device 34 has two optical elements 50, 52 in the form of two separate prisms, i.e. prisms not directly connected to each other.

The light-emitting elements 26 each are coaxially arranged on the optical axis K of the associated collimating element 28.

Figure 5:
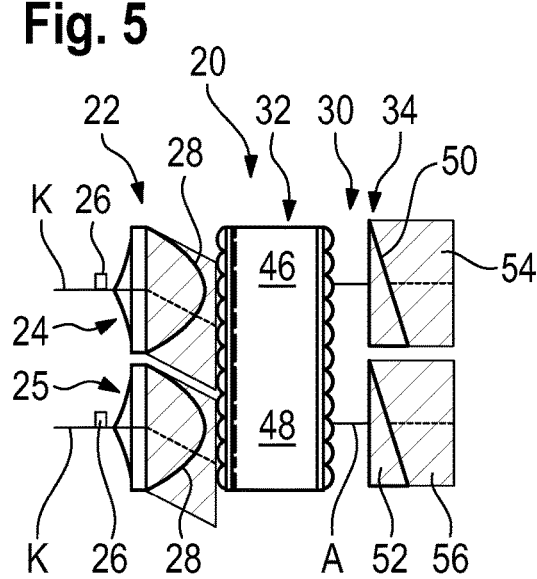
FIG. 5 shows a schematic representation of the projection system of FIG. 1 according to a fourth embodiment.

FIG. 5 shows a projection system 20 according to a fourth embodiment. In contrast to the third embodiment, the light-emitting elements 26 each are radially offset with respect to the optical axis K of the associated collimating element 28.

The arrangement of the light-emitting elements 26 relative to the associated collimating elements 28 determines the beam path of the emitted light through the projection module 30 and hence the angular range 58, 60 of the light cones 54, 56.

Figure 6:
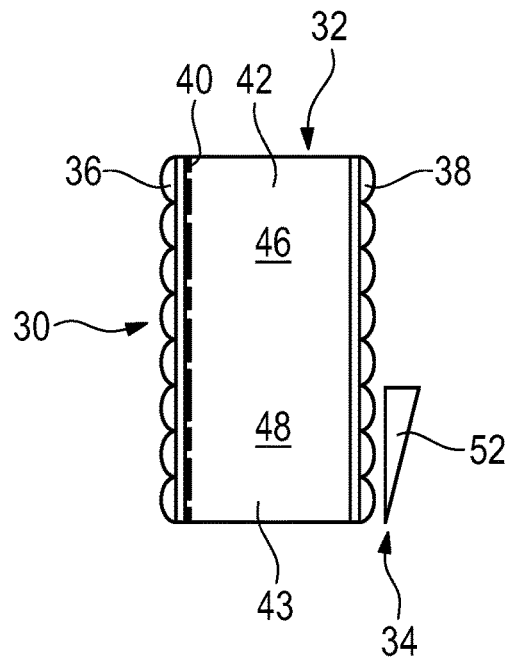
FIG. 6 shows a schematic representation of a projection module of the projection system of FIG. 1 according to a fifth embodiment.

FIG. 6 shows a projection module 30 of a projection system 20 according to a fifth embodiment. In contrast to the projection module 30 of the first embodiment, the optical device 34 has no first optical element 50, but only a second optical element 52. The light that falls through the first portion 46 thereby is deflected by the optical device 34 by an angle of 0° or is not deflected, while the light that falls through the second portion 48 is deflected by the second optical element 52.

Thus, the second optical element 52 can also be regarded as the first optical element.

Figure 7:
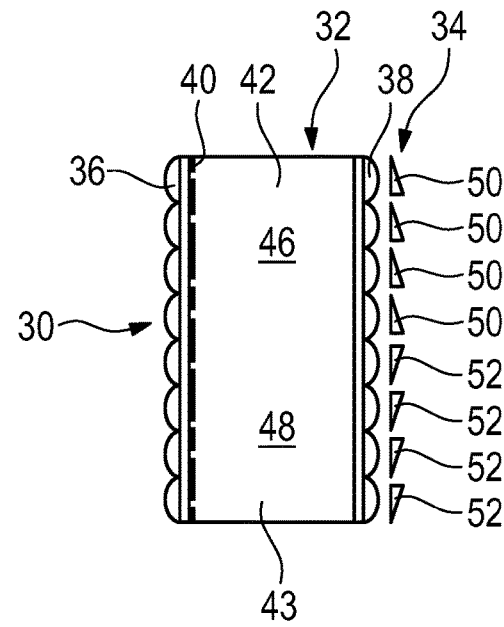
FIG. 7 shows a schematic representation of a projection module of the projection system of FIG. 1 according to a sixth embodiment.

FIG. 7 shows a projection module 30 of a projection system 20 according to a sixth embodiment. In contrast to the projection module 30 of the first embodiment, the optical device 34 does not have an individual optical element 50, 52 for all channels 42, 43 of a portion 46, 48, but each has a corresponding individual optical element 50, 52 for each channel 42, 43. The optical device 34 thereby is designed more compact, as the optical elements 50, 52 can be configured smaller.

Figure 8:
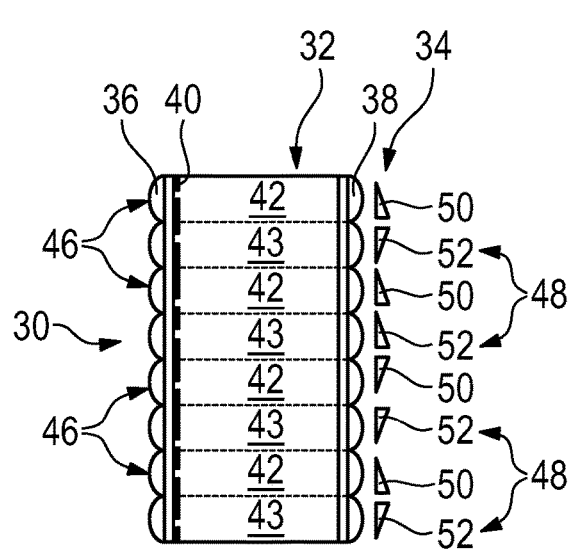
FIG. 8 shows a schematic representation of a projection module of the projection system of FIG. 1 according to a seventh embodiment.

FIG. 8 shows a projection module 30 of a projection system 20 according to a seventh embodiment, which like the projection system 20 of the sixth embodiment includes an optical device 34 with individual optical elements 50, 52 associated with each of the channels 42, 43. In contrast to the sixth embodiment, the portions 46, 48 now are no longer strictly separated from each other, but their channels 46, 48 alternate, for example.

The design and arrangement of the optical elements 50, 52 in all embodiments determine the light cones 54, 56 formed by them and their angular ranges 58, 60.

Figure 9:
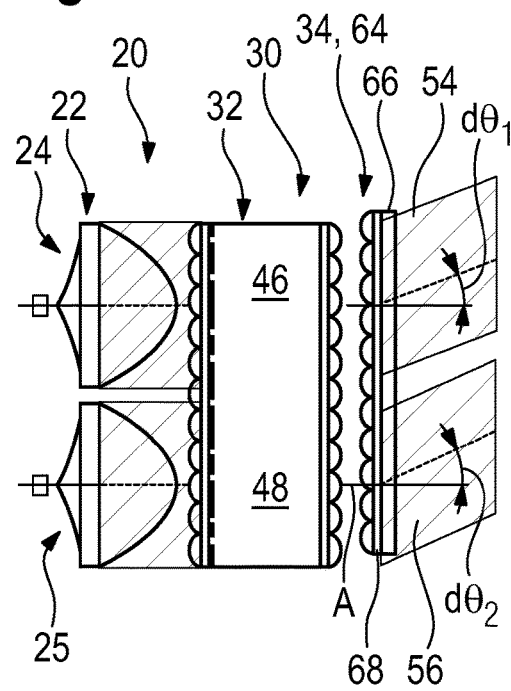
FIG. 9 shows a schematic representation of the projection system of FIG. 1 according to an eighth embodiment.

Another way to adjust the light cones 54, 56 and their angular range 58, 60 is shown in FIG. 9, which illustrates a projection system 20 according to an eighth embodiment. In contrast to the projection module 30 of the second embodiment, the optical device 34 comprises a lens array 64 with a first array portion 66 and a second array portion 68 different from the first one. The light of the first portion 46 is deflected by the first array portion 66 by a first angle $d\theta_1$ with respect to the optical axis A, while the light of the second portion 48 is deflected by the second array portion 68 by a second angle $d\theta_2$ with respect to the optical axis A.

Figure 10:
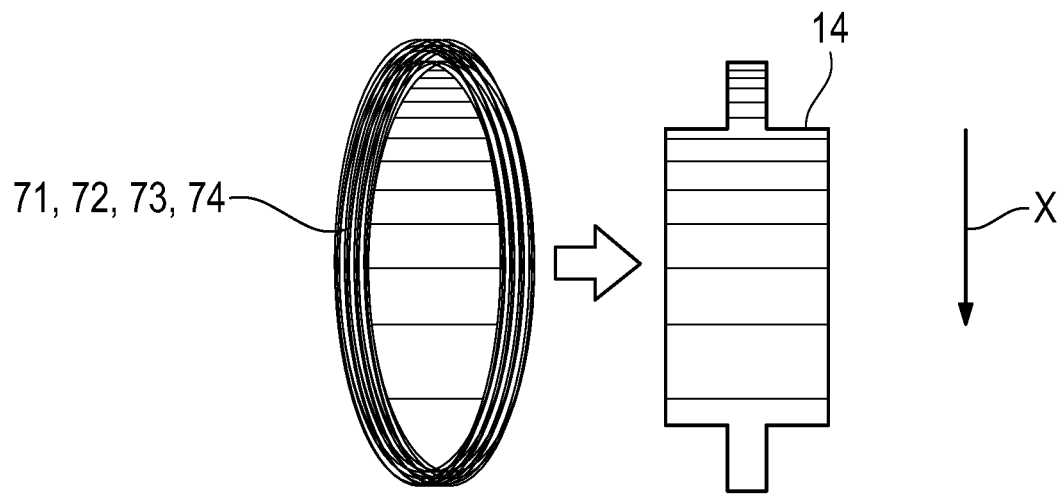
FIG. 10 shows a schematic representation of a projection of the projection system of FIG. 1 according to a ninth embodiment.

FIG. 10 shows a projection 14 that is generated by a projection system 20 according to a ninth embodiment in a first state. In contrast to the first embodiment, the projection system 20 includes a projection module 30 that is configured to generate four light cones 54, 56 each with an individual projection 71, 72, 73, 74. For this purpose, the microlens array 32 is divided into four portions 46, 48 and the optical device 34 correspondingly includes four optical elements 50, 52 that are each associated with one of the four portions 46, 48.

The projection 14 is formed by superimposing the four individual projections 71, 72, 73, 74, which each include the identical, complete motif. All individual projections 71, 72, 73, 74 are projected onto the same surface so that each individual projection 71, 72, 73, 74 completely overlaps with every other individual projection 71, 72, 73, 74.

Due to the increasing distance from the projection system 20 in the X-direction, the projection 14 has a decreasing luminous density in the X-direction.

Figure 11:
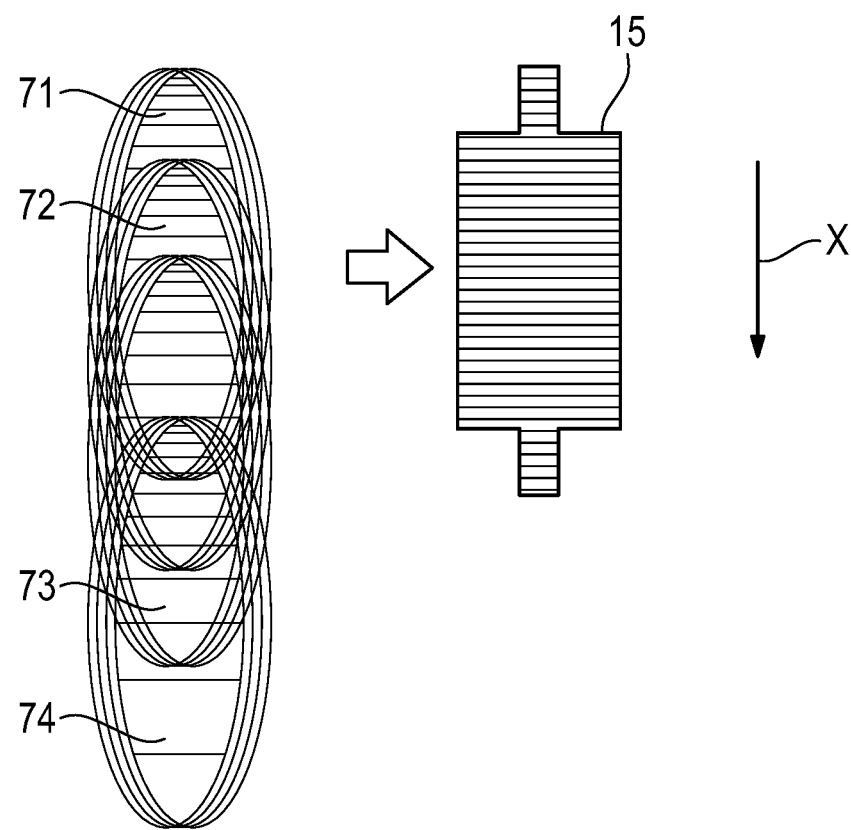
FIG. 11 shows a schematic representation of a projection of the projection system of FIG. 1 according to a tenth embodiment.

To generate a projection 15 (see FIG. 11) of homogeneous luminous density, there is provided a projection system 20 according to a tenth embodiment, which is designed analogously to the ninth embodiment.

The projection system 20 has a state in which the projection 15 is formed by superimposing the four individual projections 71, 72, 73, 74.

In contrast to the projection 14, the individual projections 71, 72, 73, 74 are projected onto mutually offset surfaces in the X-direction so that the individual projections 71, 72, 73, 74 partly overlap in the X-direction.

Each individual projection 71, 72, 73, 74 only includes the corresponding part of the motif, which is depicted on the respective surface onto which the associated light cone 54, 56 projects the individual projection 71, 72, 73, 74.

Thus, the light of the individual projection 71, 72, 73, 74 is distributed over the entire projection surface step by step, so that the luminous density is homogeneous over the entire surface of the projection 15.

Figure 12:
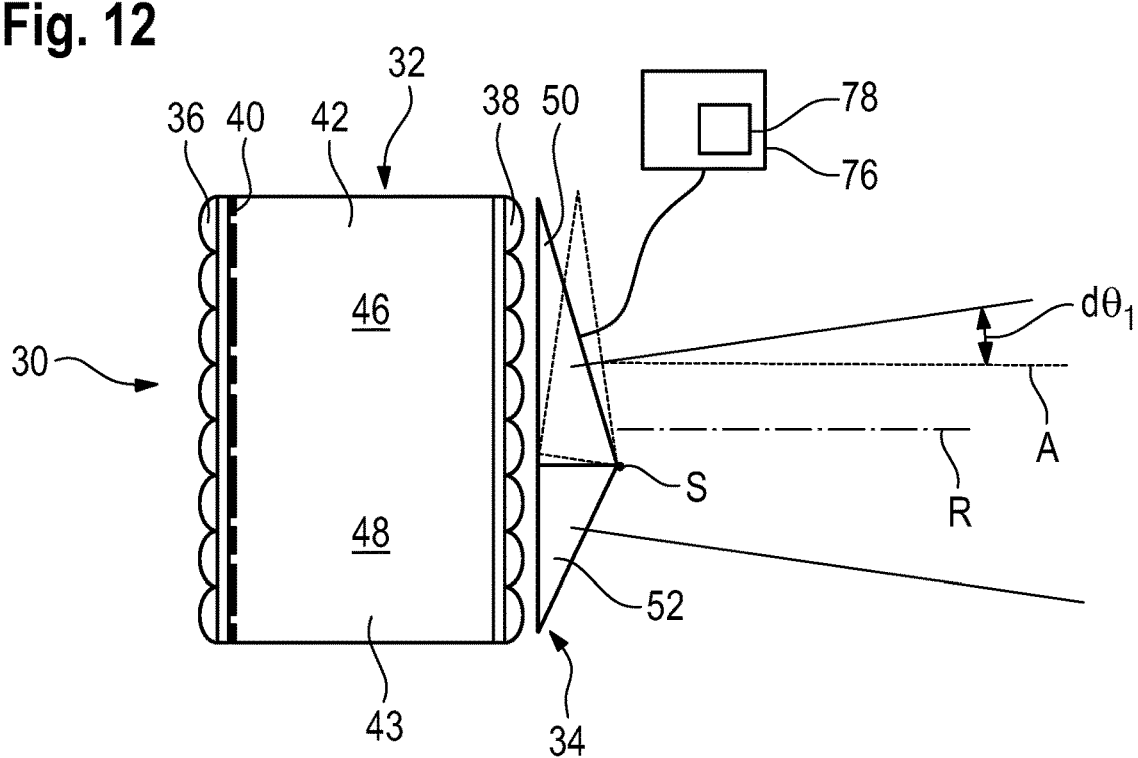
FIG. 12 shows a schematic representation of a projection module of the projection system of FIG. 1 according to an eleventh embodiment.

One way to adjust a projection system 20 into different states is shown in FIG. 12, which illustrates a projection module 30 of a projection system 20 according to an eleventh embodiment. In contrast to the projection module 30 of the first embodiment, the optical device 34 has two optical elements 50, 52 in the form of two separate prisms, i.e. prisms not directly connected to each other.

The optical elements 50, 52 can have different refractive indices and/or be made of different materials.

Furthermore, the optical device 34 comprises an adjusting device 76 with a drive 78.

By means of the adjusting device 76, the first optical element 50 can be swiveled between a first position (shown in FIG. 12 with a continuous line) and a second position (shown in FIG. 12 with a dashed line) about a swivel axis S which in FIG. 12 extends perpendicularly to the drawing plane. In the first and the second position, the light of the first portion 46 is each deflected by a different first angle $d\theta_1$.

In this way, the angular range 58 of the associated light cone 54 can be adjusted.

Of course, the second optical element 52 can additionally or alternatively be adjustable by means of the adjusting device 76.

Furthermore, the optical device 34 can be rotated about an axis of rotation R, which extends parallel to the optical axis A, by means of the drive 78.

In another embodiment, in principle, the optical device 34 or individual optical elements 50, 52 of the optical device 34 can additionally or alternatively be rotated about an arbitrary axis of rotation R by means of the drive 78.

Figure 13:
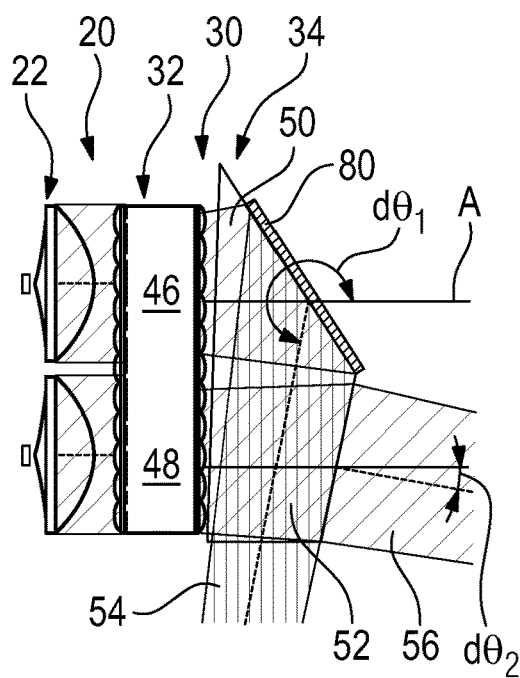
FIG. 13 shows a schematic representation of the projection system of FIG. 1 according to a twelfth embodiment.

FIG. 13 shows a projection system 20 according to a twelfth embodiment. In contrast to the projection module 30 of the second embodiment, the optical device 34 has a reflecting surface 80 that reflects the light of the first portion 46 so that the first angle $d\theta_1$ is about 260°.

Figure 14:
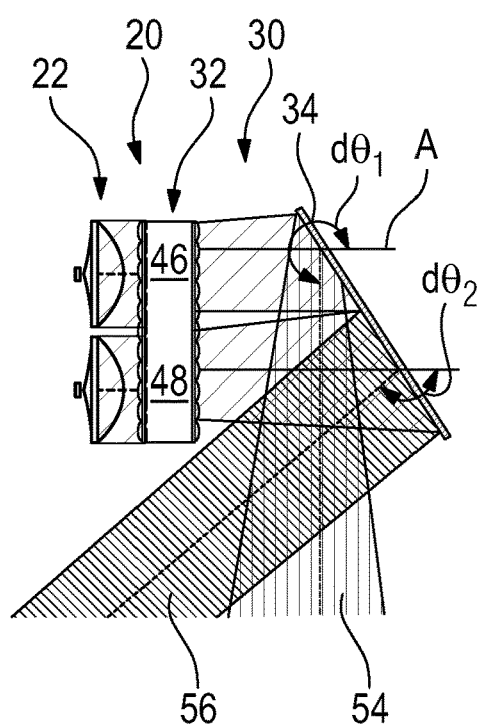
FIG. 14 shows a schematic representation of the projection system of FIG. 1 according to a thirteenth embodiment.

FIG. 14 shows a projection system 20 according to a thirteenth embodiment. In contrast to the projection module 30 of the second embodiment, the optical device 34 is a micromirror array (Digital Micromirror Device, also abbreviated with DMD) by means of which the light of the first portion 46 and the light of the second portion 48 each is reflected by a different angle.

In the illustrated exemplary embodiment, the first angle $d\theta_1$ is about 270°, while the second angle $d\theta_2$ is about −135°.

In this way, all embodiments provide a projection system 20 that is of compact design and flexibly usable.

The invention is not limited to the embodiments shown. In particular, individual features of an embodiment can be combined with features of other embodiments in any way, in particular independently of the other features of the corresponding embodiments.

The invention claimed is:

1. A projection system for a vehicle, comprising
at least one light source and
a microlens array comprising a field lens array having a plurality of field lenses, a projection lens array having a plurality of projection lenses, and a mask layer having a plurality of mask parts, which is arranged between the field lens array and the projection lens array, wherein the microlens array includes an optical axis, a first portion with at least one first channel and a second portion with at least one second channel,
wherein the projection system includes an optical device that is provided downstream of the microlens array and is arranged at least in the area of the first portion, with a distance between the microlens array and the optical device being less than 20 mm,
wherein the optical device comprises one or more optical elements selected from the group consisting of: a prism, a lens, a lens array, a freeform optic, a micromirror array and a liquid crystal matrix, and
wherein light emitted by the light source, which falls through the at least one first channel of the first portion, is deflected by the optical device by a first angle with respect to the optical axis and forms a first light cone, and light emitted by the light source, which falls through the at least one second channel of the second portion, is deflected by a second angle with respect to the optical axis, which differs from the first angle, and forms a second light cone.

2. The projection system of claim 1 wherein the optical device includes a first optical element that is associated with the first portion of the microlens array and a second optical element that is associated with the second portion of the microlens array.

3. The projection system of claim 2 wherein the projection system includes an adjusting device for the optical device, for adjusting at least one optical element of the optical device between different positions.

4. The projection system of claim 3 wherein the adjusting device includes a drive that is configured to rotate the at least one optical element of the optical device about an axis of rotation and/or to swivel the same about a swivel axis.

5. The projection system of claim 2 wherein the first optical element and the second optical element have different refractive indices and/or are made of different materials.

6. The projection system of claim 1 wherein the microlens array has a mask layer for generating a motif.

7. The projection system of claim 6 wherein the mask layer comprises a plurality of mask layers in the first portion and in the second portion which are configured to generate different motifs.

8. The projection system of claim 1 wherein the microlens array has an opaque portion between the first portion and the second portion.

9. The projection system of claim 8 wherein the microlens array has the opaque portion between the first portion and the second portion with at least one closed microlens and/or a closed channel.

10. The projection system of claim 1 wherein the first angle is more than 0°, and/or the second angle is less than 0°.

11. The projection system of claim 1 wherein the difference between the first angle and the second angle is at least 15°.

12. The projection system of claim 1 wherein the light source includes an emission unit with a light-emitting element and a collimating element, wherein the light-emitting element is arranged on the optical axis of the collimating element or offset perpendicularly to the optical axis of the collimating element.

13. The projection system of claim 1 wherein the light source includes a first emission unit and a second emission unit, wherein the first emission unit is associated with the first portion and the second emission unit is associated with the second portion.

14. The projection system of claim 1 wherein the distance between the optical device and the microlens array is less than 10 mm.

15. The projection system of claim 1 wherein the projection system has a state in which the first light cone and the second light cone do not overlap with each other, partly overlap with each other or completely overlap with each other.

16. The projection system of claim 1 wherein the projection system has a state in which the first light cone and the second light cone partly overlap such that the luminous density in a plane is homogeneous.

17. The projection system of claim 1 wherein the optical device has a reflecting surface which reflects light that falls through the at least one first channel of the first portion and/or through the at least one second channel of the second portion.

18. A vehicle comprising a projection system according to claim 1.

19. A projection system for a vehicle, comprising
at least one light source and
a microlens array, wherein the microlens array includes an optical axis, a first portion with at least one first channel and a second portion with at least one second channel, wherein the microlens array further has an opaque portion between the first portion and the second portion, wherein the projection system includes an optical device that is provided downstream of the microlens array and is arranged at least in the area of the first portion, with a distance between the microlens array and the optical device being less than 20 mm, and wherein light emitted by the light source, which falls through the at least one first channel of the first portion, is deflected by the optical device by a first angle with respect to the optical axis and forms a first light cone, and light emitted by the light source, which falls through the at least one second channel of the second portion, is deflected by a second angle with respect to the optical axis, which differs from the first angle, and forms a second light cone.

20. A projection system for a vehicle, comprising
at least one light source and
a microlens array, wherein the microlens array includes an optical axis, a first portion with at least one first channel and a second portion with at least one second channel, wherein the microlens array further has a mask layer for generating a motif and a projection lens array, wherein the mask layer in the first portion and in the second portion is configured to generate different motifs, wherein the projection system includes an optical device that is provided downstream the microlens array and is arranged at least in the area of the first portion, with a distance between the microlens array and the optical device being less than 20 mm, and wherein light emitted by the light source, which falls through the at least one first channel of the first portion, is deflected by the optical device by a first angle with respect to the optical axis and forms a first light cone, and light emitted by the light source, which falls through the at least one second channel of the second portion, is deflected by a second angle with respect to the optical axis, which differs from the first angle, and forms a second light cone.

* * * * *